(12) United States Patent
Bietz et al.

(10) Patent No.: US 11,997,948 B2
(45) Date of Patent: Jun. 4, 2024

(54) PIVOTING SAFETY STOP FOR A BALL-JOINTED CYLINDER

(71) Applicant: CNH Industrial America LLC, New Holland, PA (US)

(72) Inventors: Seth Bietz, Bettendorf, IA (US); Jonathan E. Ricketts, Davenport, IA (US); David M. DeChristopher, Ephrata, PA (US); Barry E. Lehman, York, PA (US); Joel T. Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 306 days.

(21) Appl. No.: 17/388,764

(22) Filed: Jul. 29, 2021

(65) Prior Publication Data

US 2023/0034156 A1 Feb. 2, 2023

(51) Int. Cl.
*F15B 15/26* (2006.01)
*A01D 41/14* (2006.01)

(52) U.S. Cl.
CPC ............ *A01D 41/145* (2013.01); *F15B 15/26* (2013.01); *F15B 2015/267* (2013.01)

(58) Field of Classification Search
CPC .................. F15B 20/004; F15B 15/261; F15B 2015/257; F15B 15/26
See application file for complete search history.

(56) References Cited

U.S. PATENT DOCUMENTS 3,662,653 A * 5/1972 Carlson ................. F15B 15/261
                                                   188/67
3,840,220 A * 10/1974 McConnell ............... E05F 3/04
                                                   188/315

(Continued)

FOREIGN PATENT DOCUMENTS

DE         69914140 T2  * 11/2004
DE       102004042126 A1    3/2006

OTHER PUBLICATIONS

Machine Translation of DE69914140 is merged with the original reference.*

(Continued)

*Primary Examiner* — Kenneth Bomberg
*Assistant Examiner* — Daniel S Collins
(74) *Attorney, Agent, or Firm* — Peter K. Zacharias; Rebecca L. Henkel; Rickard K. DeMille

(57) ABSTRACT

An actuator assembly for moving an implement attached to an agricultural vehicle. The actuator assembly includes an actuator comprising a longitudinal axis, a cylinder extending along the longitudinal axis, and a piston rod extending from the cylinder along the longitudinal axis and that is configured to be attached to the implement at a connection point. A safety stop is pivotably attached at the connection point and is movable between a deployed position where the safety stop is configured to block retraction of the actuator, and a retracted position where the safety stop is not configured to block retraction of the actuator. The safety stop is configured to rotate with respect to the actuator about a first (Continued)

rotational axis that is orthogonal to the longitudinal axis, as well as a second rotational axis that is orthogonal to both the longitudinal axis and the first rotational axis.

16 Claims, 3 Drawing Sheets

(56) References Cited

U.S. PATENT DOCUMENTS

| | | |
|---|---|---|
| 4,073,345 A | 2/1978 | Miller |
| 4,529,215 A | 7/1985 | Strand |
| 5,009,566 A | 4/1991 | Asche |
| 9,554,500 B2 | 1/2017 | Smith et al. |
| 2009/0107094 A1 | 4/2009 | Bich et al. |

OTHER PUBLICATIONS

International Search Report and Written Opinion for Application No. PCT/US2022/038691 dated Oct. 18, 2022 (10 pages).

* cited by examiner

PIVOTING SAFETY STOP FOR A BALL-JOINTED CYLINDER

FIELD OF THE INVENTION

The present invention relates to a safety stop for a pneumatic or hydraulic cylinder actuator.

BACKGROUND OF THE INVENTION

As is described in U.S. Pat. No. 3,662,653 (the '653 Patent), which is incorporated by reference in its entirety and for all purposes, in certain hydraulic or pneumatic actuator applications, it is desirable for reasons of safety to provide means whereby a piston rod of the actuator can be positively locked in an extended position to prevent retraction of the piston rod in the event of a sudden loss of fluid line pressure, for example.

In a typical application, the actuator includes a piston mounted within a substantially enclosed cylinder, whereby the piston includes a rod extending outside of the cylinder. One end of the cylinder is mounted to a stationary structure (combine harvester housing or header housing) and the rod is connected to an implement (e.g., combine harvester reel, draper header section, header, feeder, wheel, suspension system, etc.). The actuator is configured to move the implement with respect to the stationary structure. When an implement is raised by the actuator for maintenance purposes, for example, the piston rod is normally fully extended, and it is desirable, for the reasons noted above, to provide means independent of the fluid pressure supply for preventing accidental retraction of the actuator rod.

The '653 Patent describes a rigid, elongated safety stop of generally U-shaped cross-section adapted to fit over the extended piston rod of an actuator and having opposite ends engageable with the cylinder body and outer end of the rod, respectively, to prevent retraction of the latter. The safety stop is pivotally mounted on the outer end of the rod for swinging movement between its operative position and an inoperative position.

Though not disclosed in the '653 Patent, in an application where a piston rod of the actuator is mounted to the implement by a ball joint, it is possible that the piston rod (or other surface of the actuator) could undesirably contact and interfere with the safety stop when the piston rod pivots on the ball joint. Described herein is a safety stop that accommodates movement of the piston rod about the ball joint.

SUMMARY OF THE INVENTION

According to one aspect of the invention, an actuator assembly is configured for moving an implement attached to an agricultural vehicle. The actuator assembly includes an actuator comprising a longitudinal axis, a cylinder extending along the longitudinal axis, and a piston rod extending from the cylinder along the longitudinal axis and that is configured to be attached to the implement at a connection point. A safety stop is pivotably attached at the connection point and is movable between a deployed position where the safety stop is configured to block retraction of the actuator, and a retracted position where the safety stop is not configured to block retraction of the actuator. The safety stop is configured to rotate with respect to the actuator about a first rotational axis that is orthogonal (i.e., perpendicular) to the longitudinal axis, as well as a second rotational axis that is orthogonal to both the longitudinal axis and the first rotational axis.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
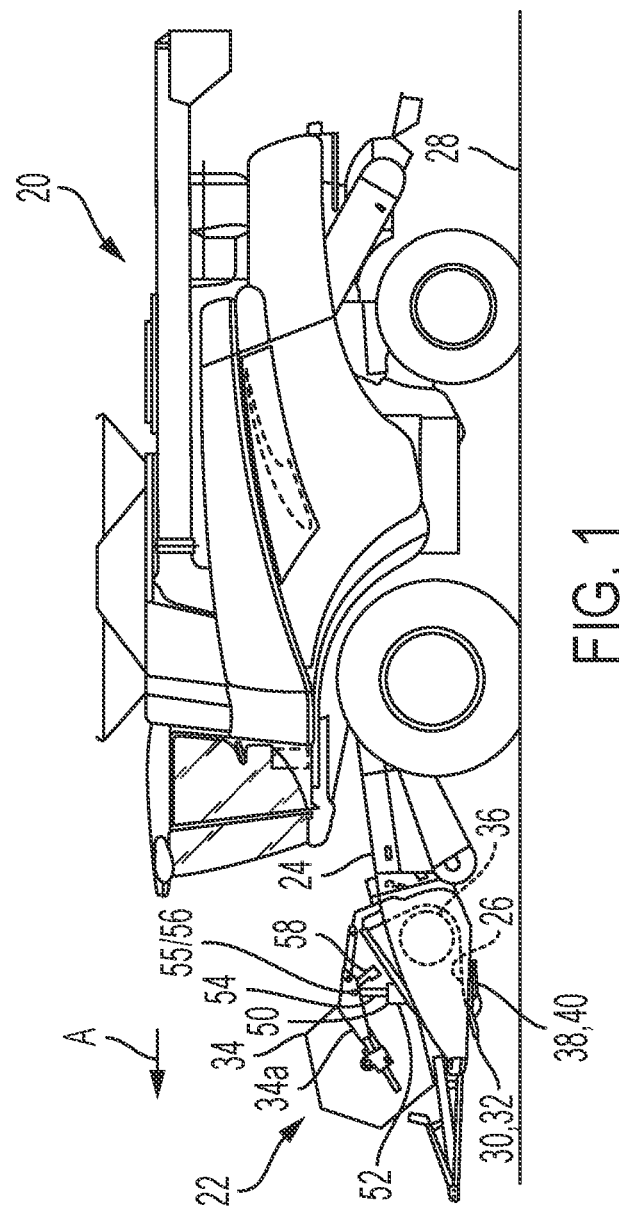
FIG. 1 depicts a side view of an agricultural combine having a header in a raised position above the ground, showing a reel of the header supported in a suitable position above the cutter bar.

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

As is described in U.S. Patent App. Pub. No. 2009/0107094 to CNH Industrial America LLC, which is incorporated by reference herein in its entirety, there is shown in FIG. 1 an agricultural combine 20 including a header 22 supported on a feeder 24, for cutting or severing crops and inducting the severed crops into feeder 24 for conveyance into combine 20 for threshing and cleaning as combine 20 moves forwardly over a field, as denoted by arrow A. Header 22 includes a bottom or pan 26 which is supported in desired proximity to a ground surface 28 of a field during the harvesting operation, and an elongate, sidewardly extending cutter bar 30 supporting elongate, reciprocally movable sickle knives 32 disposed along a forward edge of pan 26 which sever the crop for induction into header 22.

Header 22 includes an elongate, sidewardly extending reel 34 disposed above pan 26 and rotatable in a direction for gathering the crops to be cut toward cutter bar 30, and then for facilitating induction of the severed crops into header 22. An elongate, rotatable auger 36 extends in close proximity to a top surface of pan 26 and has spiral flights therearound (not shown) which convey the severed crops to feeder 24 for induction into combine 20.

Turning now to FIGS. 2-5, reel 34 is movable upwardly and downwardly in relation to header 22 and cutter bar 30, for achieving desired crop cutting and induction characteristics. One actuator 50 for moving reel 34 upwardly and downwardly is shown in those figures.

More particularly, reel 34 is fixedly mounted to a supporting arm 34a of reel 34, and at least one hydraulic actuator 50 is connected between supporting arm 34a and the stationary housing of header 22 for moving reel 34 in the aforementioned directions with respect to ground 28. Arm 34a includes a flange or other surface forming a connection point 56 to which actuator 50 and a safety stop 58 are connected. An axis of rotation 'B' of safety stop 58 is formed by and at connection point 56.

Actuator 50 and safety stop 58 together comprise an actuator assembly.

Referring now to the individual component of the actuator assembly, actuator 50 comprises a cylinder 52, a piston movably positioned inside of the cylinder 52, a rod 54 having one end that is connected to the internal piston and an opposite end connected to a rod eye 53. Rod eye 53 is adjustably mounted to rod 54 by a threaded fastener 57. Fastener 57 is utilized to adjust the distance between rod eye 54 and cylinder 52 along longitudinal axis 'C' (FIG. 5) of actuator 50, which adjustment influences the total extended length of actuator 50. Rod eye 53 includes an aperture for receiving a fastener 60 for pivotably connecting actuator 50 to arm 34a. Rod eye 53 includes a spherical ball joint 55 (referred to as ball joint 55) that is connected to fastener 60. More generally, ball joint 55 has three degrees of freedom of rotation (i.e., rotation about axis B, C and D), and zero degrees of freedom of translation. Ball joint 55 is capable of pivoting so that the rod 54 and its eye 53 can pivot with respect to reel 34 and safety stop 58. Axis D extends radially from the aperture in which fastener 60 is positioned. Axes B, C and D are all orthogonal with respect to each other.

The opposing end 52a of actuator 50 is pivotably mounted to a housing of header 22 (or other surface) by a spherical ball joint at 52a, for example. The ball joint on the opposing end 52a together with ball joint 55 at the top end of actuator 50 permits the axis B at the top of actuator 50 to be non-parallel with a counterpart axis E (FIG. 2) at the bottom of actuator 50. Stated differently, if actuator 50 is considered to comprise rod eye 53, one end of actuator 50 is connected to the vehicle at a first point (at 52a) by a first fastener (at 52a) extending along a first fastener axis E, and the opposing end of actuator 50 is connected to the vehicle at a second point 55 by a second fastener 60 extending along a second fastener axis B, wherein the first and second fastener axes E and B are non-parallel. It should be understood that the composition, position and arrangement of actuator 50 can vary and is not limited to that which is shown in FIG. 1.

Figure 2:
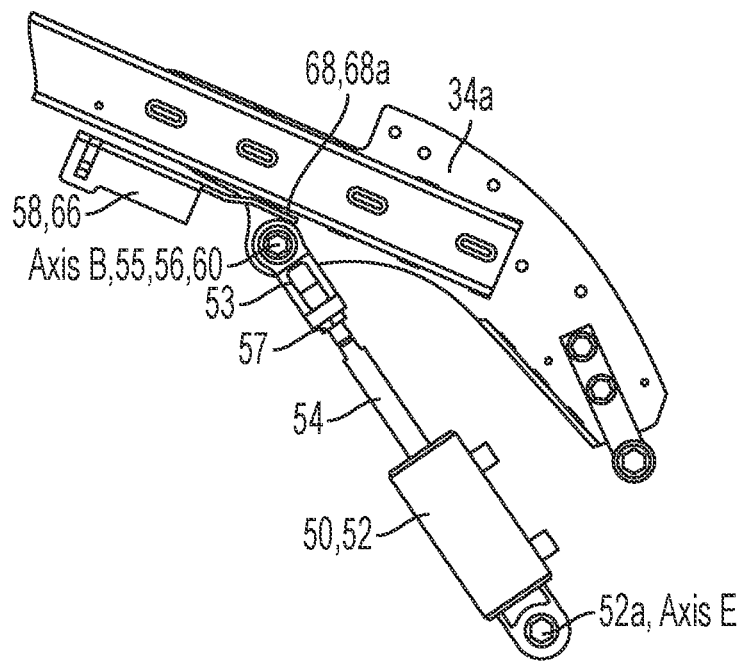
FIG. 2 depicts a side view of a reel actuator of the combine of FIG. 1, whereby a safety stop of the reel actuator is shown in a retracted position.
Figure 3:
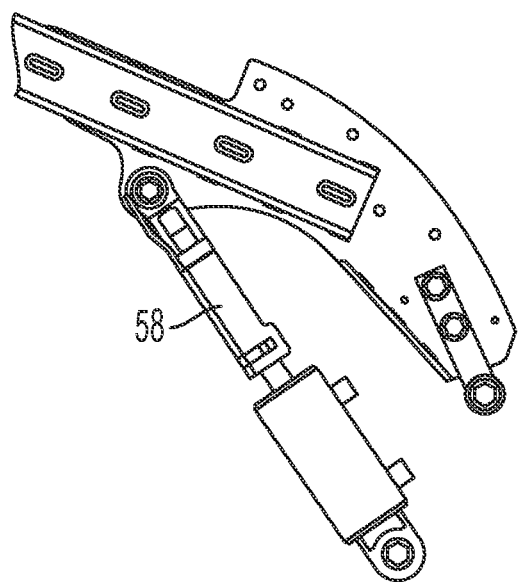
FIG. 3 depicts another side view of the reel actuator of the combine of FIG. 1, whereby the safety stop of the reel actuator is shown in a deployed position.
Figure 4:
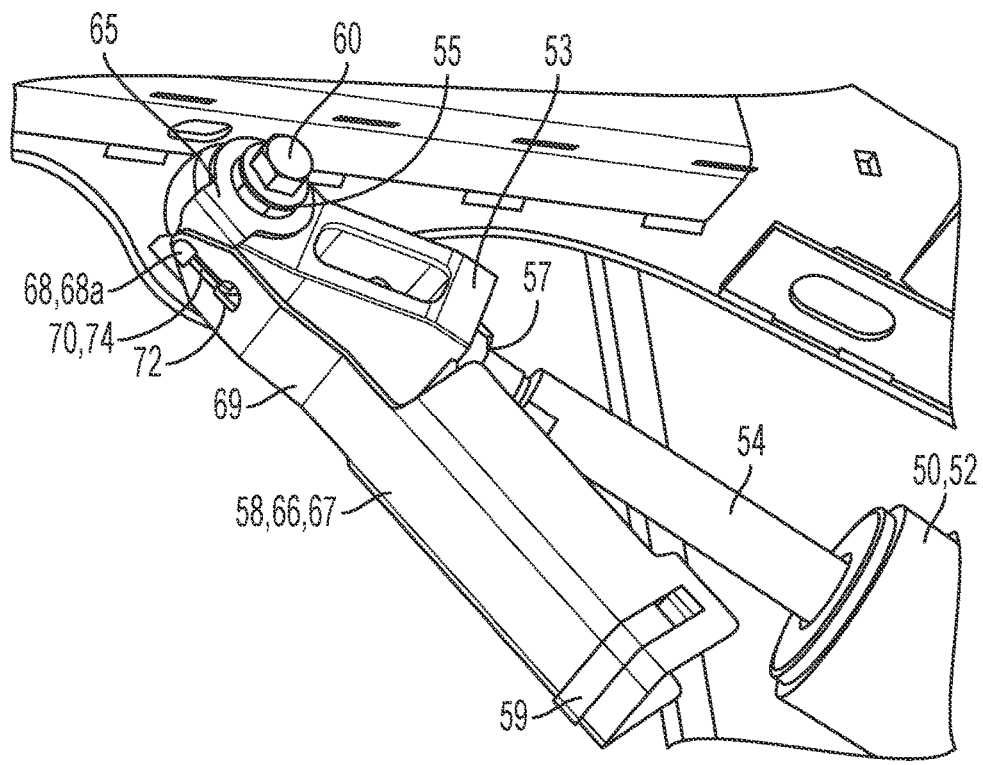
FIG. 4 is an isometric view of the reel actuator of the combine of FIG. 1, whereby the safety stop is shown in a position midway between the retracted and deployed positions.

Safety stop 58 is pivotably mounted to connection point 56 on reel arm 34a by fastener 60. Safety stop 58 is pivotable about axis B between a retracted position (FIG. 2) and a deployed position (FIG. 3). A clip, clamp or fastener (not shown) on arm 34a may also be releasably connectable to a clip 59 on the body of safety stop 58 to retain safety stop 58 in the retracted position while safety stop 58 is not in use. Other ways for releasably attaching safety stop 58 to arm 34a are envisioned. In the retracted position of safety stop 58, the free end of the safety stop 58 is separated from the actuator 50, and does not serve its function as a safety stop in the event of failure of the hydraulic system. In the deployed position, safety stop 58 is positioned either in contact or in near contact with cylinder 52 so that if the hydraulic system fails, the weight of reel 34 will bear on safety stop 58 and cylinder 52, thereby preventing rod 54 from retracting and reel 34 from falling in the downward direction. Stop 58 is typically moved to the deployed position during a maintenance procedure for actuator 50 during which actuator 50 is moved to the fully extended position. The extended position of actuator 50 is shown in FIGS. 2 and 3. Clip 59 may also be used to releasably attach to rod 54 for maintaining safety stop 58 in the deployed position.

Safety stop 58 is (optionally) a two-piece component comprising a clevis 65 and a stop body 66 that is mounted to clevis 65. Clevis 65 comprises a U-shaped and bifurcated body having two arms and a channel formed between the arms for accommodating the width of eye 53. Each arm of clevis 65 includes an opening that is sized to receive the body of fastener 60. Clevis 65 is configured to pivot about axis B relative to actuator 50, as shown in FIGS. 2 and 3. A projection 68 having a non-circular head 68a extends from the body of clevis 65. Head 68a extends along axis D and radially with respect to the opening in which fastener 60 is positioned. Axis D is orthogonal to axis B along which fastener 60 extends and safety stop 58 pivots. The non-circular shape of head 68a aids in preventing stop 58 from inadvertently detaching from clevis 65 when moving stop 58 between the retracted and deployed positions. It is noted, however, that head 68a may also be circular, if so desired.

Stop body 66 comprises a U-shaped member 67 having two opposing arms, and an elongated and flat portion 69 extending from member 67. A channel is formed between the two arms of member 67 for accommodating rod 54. In the deployed position of stop 58, the arms of member 67 are positioned between the bearing surface 73 of eye 53 and the bearing surface 75 of cylinder 52. The arms of member 67 also aid in maintaining surfaces 73 and 75 parallel to each other. In the event of hydraulic failure while stop 58 is maintained in the deployed position, the solid, rigid and (optionally) metallic body of member 67 will contact the opposing bearing surfaces 73 and 75 and prevent further (or any) retraction of actuator 50. Arms of member 67 are disconnected from and spaced apart from arms of clevis 65 to accommodate the length of eye 53 when safety stop 58 is maintained in the deployed position shown in FIG. 5.

A slot 70 is disposed in body 66 and includes a non-circular opening 72 at a leading end thereof, which has a shape complimentary to the shape of head 68a and is slightly larger than head 68a, and a rectangular channel 74 extending from opening 72. Though opening 72 and head 68a share the same shape, opening 72 is rotated by 90 degrees about axis D with respect to head 68a, such that opening 72 (and its body 66) can be connected to head 68a and its clevis 65 in an orientation that is 90 degrees from the normal operational position of body 66 shown in FIG. 4. Once body 66 is installed onto head 68a and rotated back to the normal operational position shown in FIG. 4, body 66 cannot be removed from clevis 65 without rotating body 66 by 90 degrees about axis D, thereby preventing the possibility of inadvertent detachment of body 66 from clevis 65 during use. The shape of non-circular components 68a and 72 may be semi-circular with a flat portion, as shown, or can have another non-circular shape without departing from the invention.

Figure 5:
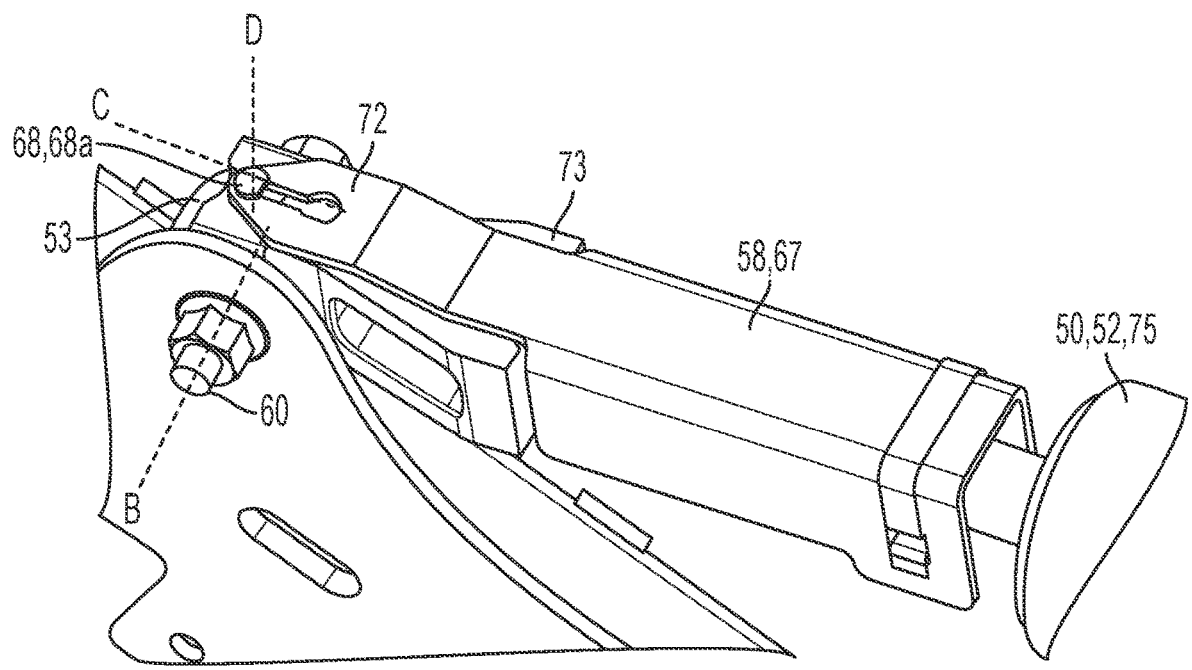
FIG. 5 is another isometric view of the reel actuator of the combine of FIG. 1, whereby the safety stop is shown in the deployed position.

Channel 74 of slot 70 is provided to permit translation of body 66 along axis C when safety stop 58 is maintained in the deployed position shown in FIG. 5. Such translation compensates for dimensional tolerances in the length of eye 53 and position of cylinder 52. Channel 74 also accommodates any adjustments to the length of rod 54 protruding from cylinder 54. The length of rod 54 may be manually adjusted (for example) by adjusting the fastener 57 (or other fastener) on the ends of actuator 50. It should be understood that when safety stop 58 is maintained in the deployed position, slot 70 extends along an axis that is either parallel to or overlaps with axis C.

Various modifications may be made to the invention described herein. More particularly, safety stop 58 may vary from that which is shown and described. For example, clevis 65 and stop body 66 may be rotatably and slideably connected together by a fastener, lock washer, or an elastic component. Such an elastic component would compensate for the above described tolerance issue, and, therefore, channel 74 may be omitted.

Although slot 70 is described as being positioned on body 66 and projection 68 is positioned on clevis 65, it should be understood that slot 70 may be positioned on body 66 and projection 68 may be positioned on clevis 65.

Also, although clevis 65 is described as being a clevis, and eye 53 is described as being an eye, it should be understood that item 65 may be an eye and item 53 may be a clevis.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An actuator assembly for moving an implement attached to an agricultural vehicle, said actuator assembly comprising:
    an actuator comprising a longitudinal axis, a cylinder extending along the longitudinal axis, and a piston rod extending from the cylinder along the longitudinal axis and that is configured to be attached to the implement at a connection point, wherein the actuator is configured to expand and retract along the longitudinal axis for moving the implement,
    a safety stop that is pivotably attached at the connection point and is movable with respect to the actuator between a deployed position where the safety stop is configured to block retraction of the actuator, and a retracted position where the safety stop is not configured to block retraction of the actuator,
    wherein the safety stop is configured to rotate with respect to the actuator about a first rotational axis that is orthogonal to the longitudinal axis, as well as a second rotational axis that is orthogonal to both the longitudinal axis and the first rotational axis,
    wherein the safety stop is rotatable about the first rotational axis for moving the safety stop between the deployed and retracted positions, and the safety stop is rotatable about the second rotational axis for moving the safety stop between a first rotational position where the safety stop is not aligned to be disconnected from the connection point and a second rotational position where the safety stop is aligned to be disconnected from the connection point,
    wherein the safety stop comprises a first component mounted at the connection point, and a second component that is pivotably mounted to the first component about the second rotational axis, and
    wherein the second component includes a slot and the first component includes a projection, or vice versa, and wherein, the slot is configured to translate along the projection.

2. The actuator assembly of claim 1, wherein the piston rod is attached at the connection point by a ball joint, and the piston rod is configured to pivot on the ball joint about the second rotational axis.

3. The actuator assembly of claim 1, wherein the second component includes a U-shaped body defining a channel that is sized to accommodate the piston rod.

4. The actuator assembly of claim 1, wherein the first component includes a clevis that is mounted at the connection point.

5. The actuator assembly of claim 4, wherein the piston rod includes a rod eye that is positioned between arms of the clevis.

6. The actuator assembly of claim 5, further comprising a fastener mounted through openings in the arms of the clevis and the rod eye, wherein the fastener is positioned along the first rotational axis.

7. The actuator assembly of claim 6, wherein the piston rod includes a rod that is adjustably connected to the rod eye along the longitudinal axis.

8. The actuator assembly of claim 1, wherein the projection includes a head having a non-circular shape that is configured to be inserted into a non-circular shaped opening in the slot, and the projection forms the second rotational axis.

9. The actuator assembly of claim 1, wherein the slot is connected to the projection by a fastener.

10. The actuator assembly of claim 1, wherein the U-shaped body of the second component includes opposing arms, and the arms are spaced from and positioned apart from the first component.

11. The actuator assembly of claim 1, wherein, in the deployed position, the safety stop is configured to translate along the longitudinal axis.

12. The actuator assembly of claim 1, wherein, in the deployed position, the safety stop is configured to be positioned between a first bearing surface of the piston rod and a second bearing surface of the cylinder, wherein the first and second bearing surfaces face one another.

13. The actuator assembly of claim 1 further comprising a hydraulic fluid line connected to the actuator for moving the actuator between extended and retracted positions.

14. The actuator assembly of claim 1, wherein the actuator is connected to the vehicle at a first point by a first fastener extending along a first fastener axis, and the actuator is also connected to the vehicle at a second point by a second fastener extending along a second fastener axis, wherein the first and second fastener axes are non-parallel.

15. An agricultural harvester comprising a feeder, a header supported on the feeder, a reel attached to the header, and the actuator assembly of claim 1 for moving the reel with respect to the header.

16. A header for the agricultural vehicle comprising the actuator assembly of claim 1, wherein the header includes a feeder, and the actuator assembly is configured for moving the reel with respect to the header.

* * * * *